Jan. 19, 1971  W. H. BLEECKER  3,556,741
METHOD OF KEYING A CARBIDE WORKPIECE TO A DRIVE MEMBER
Filed Nov. 20, 1968
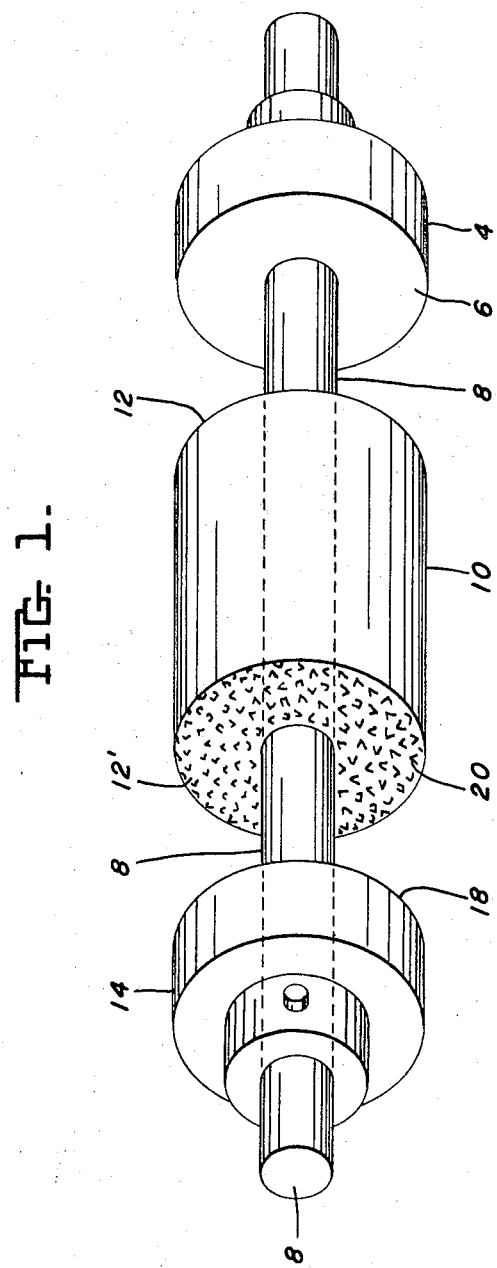
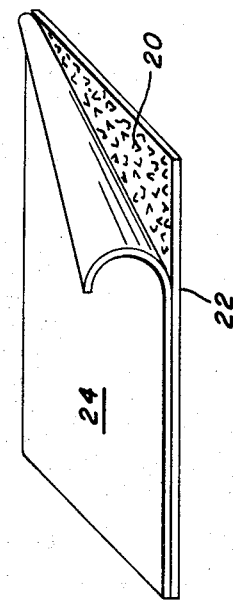
INVENTOR.
WILLIAM H. BLEECKER
By
Attorney

United States Patent Office 3,556,741
Patented Jan. 19, 1971

3,556,741
METHOD OF KEYING A CARBIDE WORKPIECE TO A DRIVE MEMBER
William H. Bleecker, Pleasant Ridge, Mich., assignor to Carmet Company, Pittsburgh, Pa., a corporation of New Jersey
Filed Nov. 20, 1968, Ser. No. 777,276
Int. Cl. B23p *11/00*
U.S. Cl. 29—148.4                         10 Claims

ABSTRACT OF THE DISCLOSURE

A method of mechanically locking a work roll to a steel drive hub which includes brazing a carbide grit to the lateral surfaces of the roll and pressing the grit into the cooperating surface of the steel drive hub eliminating any void between the roll and the hub to lock the roll and hub in such relation.

BACKGROUND OF THE INVENTION

This invention relates to the keying of a workpiece such as a ring or work roll to a drive member. More specifically the invention herein disclosed teaches a method of eliminating relative movement between a carbide work roll sleeve and the associated drive member when being utilized in a rolling mill to hot roll steel bars. Previous methods of securing the carbide roll sleeves to the steel roll drive mechanisms included press fitting the carbide sleeve on the steel shaft and by providing lugs and cooperating grooves in the sleeves and roll drives. Both of these methods have certain disadvantages. The carbide sleeve encounters additional stresses when press-fit due to the different coefficient of expansion of carbide and steel and is subject to splitting. The lug and cooperating groove-method develops stresses as the roll is driven and also concentrates drive stresses in the lug or groove areas inviting breakdown.

SUMMARY OF THE INVENTION

This disclosure teaches a method of mechanically locking together a surface of a roll and a cooperating surface of a drive member by interposing particular grit, of a hardness greater than at least one of the roll or drive members, between a surface of the roll and the cooperating surface of the drive member, juxtaposing said surfaces with the grit between them, forcing the roll and drive member together to cause the grit to penetrate at least one of the surfaces and bonding the grit to the other surface thereby mechanically locking he roll to the drive member.

It is therefore an object of the subject invention to provide a method of mechanically locking together a roll surface and a cooperating surface of a drive member so that both may be driven by a common driving force without slippage.

A further object of the invention is to provide a method for mechanically locking together a roll surface and a cooperating surface of a drive member which transmits the drive force uniformly to the driven workpiece.

Still another object of the invention is to provide a method of keying a driven workpiece to a workpiece drive which includes bonding an abrasive grit to the roll surface or drive member surface and pressing the members together such that the grit penetrates a surface of the associating member forming a mechanical connection between the members.

These and other objects will become evident upon further reading of the specification and the drawings.

BRIEF DESCRIPTION OF THE DRAWINGS

FIG. 1 is a pictorial view of a work roll and associated drive.

FIG. 2 is a pictorial view of a copper sheet sandwich containing particles of grit.

DESCRIPTION OF THE PREFERRED EMBODIMENT

Referring now to the drawings, reference numeral 4 on FIG. 1 indicates a fixed roll flange having a cooperating surface 6 on the flange 4 and a shaft 8. A carbide roll sleeve 10 having lateral surfaces 12 and 12' slidably fits over shaft 8 with surface 12 in close relation to the cooperating surface 6. A locking flange 14 is force-fit on shaft 8 and flange 14 has a cooperating surface 18 in close relation to lateral surface 12'. Interposed between surfaces 6–12 and 18–12' are particles 20 of grit which are bonded to surfaces 12 and 12' and interact with surfaces 6 and 18 when hub 14 is forced into intimate contact and presses roll 10 between it and flange 4 thereby mechanically locking same.

FIG. 2 shows one embodiment of a preparation of particles 20 of carbide grit pressed between copper or copper alloy sheets 22 and 24 for bonding to surfaces 12 and 12'.

In the preferred assembly the carbide roll sleeve 10 is prepared to lock with the flanges 4 and 14 by first having the roll lateral surfaces 12 and 12' coated with a slurry containing powder of a suitable brazing material such as copper or copper-alloy and a suitable temporary binding vehicle such as a solution of acetone in which 2% Lucite is dissolved. A slurry wherein the proportions by weight of 20% acetone to 80% copper powder has proven satisfactory but these proportions may be varied to suit the method of application. Particles 20 of carbide grit, preferably tungsten carbide of a mesh in the range of +20 to—30 mesh, are then sprinkled on the wet surfaces 12 and 12' and the acetone is permitted to evaporate leaving the Lucite to temporarily bind the powder and grit 20 to the roll 10. Generally, larger mesh grit is used in applications wherein the cooperating surfaces are softest and readily penetrated. Care must be used in sprinkling the grit to insure a light uniform layer. Further, the density of particles 20 must be low enough so as to penetrate surfaces 6 and 18 and not support them in the subsequent assembly. The prepared sleeve 8 is then brazed at about 2100° F. in the customary manner top ermit the copper or copper alloy to melt and flow around the particles 20 and the adjacent surface of the roll. The brazing material may chemically bond, i.e. to alloy, to a limited degree with the carbide base.

With the particles 20 of carbide grit now bonded to surfaces 12 and 12', sleeve 10 is slidably inserted over shaft 8 and pressed firmly against roll flange 4. Locking flange 14 is then slidably inserted over shaft 8 and pressed firmly against sleeve 10. Sufficient pressure is exerted on the flange 4 and 14 such that the particles 20 penetrate the surfaces 6 and 18 adjacent surfaces 12 and 12' of sleeve 10 and mechanically lock the surfaces together. It is important that the pressure be sufficient to seat the grit within the adjacent steel member such that they are in intimate contact i.e. there is substantially no void between the mating surfaces. Flange 14 is then secured in position so that the grit particles 20 remain embedded in the surfaces 6 and 18 thereby locking carbide sleeve 10 such that no relative motion is experienced between the sleeve 10 and flanges 4 and 14 when the shaft 8 is rotated. Flange 14 is force-fit on shaft 8 in the preferred embodiment, however another conventional method of securing such as pinning, would be acceptable. Further, with the bonded particles 20 in multiple engagements with the surfaces 6 and 18 the driving forces are transmitted over the area of the cooperating surfaces of contact. This provides a uniform transmission of force and the elimination of stress areas thereby reducing the likelihood of material fatigue and breakdown.

An alternate method of preparing the carbide sleeve 10 with the particles 20 grit is partially demonstrated in FIG. 2. The particles 20 are sprinkled lightly and uniformly upon a copper or copper alloy sheet 22. Sheets of a thickness of 0.005" are adequate. A second similar sheet 24 is placed over the grit and the two sheets are pressed together. A pressure of 10 tons per square inch is satisfactory to hold the grit in place. The sandwich may then be attached to the surfaces 12 and 12' by any suitable means for the furnace treatment, such as being wired.

It has been shown that a roll surface may be mechanically locked to the surface of a driven member by means of bonding an abrasive particulate material of a hardness greater than at least one of the surfaces to a surface and pressing the roll and driving member together such that the abrasive particulate material penetrates the surface of a softer member. By such method a workpiece and drive member are joined such that the translated working forces are distributed evenly through the contact area of the driving member and driven member. Further, it is evident from the above that either the roll or the drive member surfaces might bear the bonded grit if practical considerations call for the other member to be the softer member. Beyond this, it should be clear that the mechanical lock may be created between the juxtaposed surfaces if they are substantially the same hardness and both softer than the grit and they are pressed together such that the grit penetrates both surfaces. It should also be evident that since the bond strength characteristic of the bond of the grit to one of the surfaces need be only sufficient to withstand the forces transmitted, and if such forces are sufficiently low, an adhesive material such as an epoxy resin may be utilized in place of brazing. Likewise brazing alloys other than copper may be employed providing bonding force requirements are met.

The preferred embodiment shows the lateral surfaces 12 and 12' coated with grit, however, other applications of the disclosed mechanical lock between surfaces may be made utilizing the grit on the shaft as the inner surface of the roll sleeve and the locking interaction achieved through a shrink fit of the sleeve 10 over the shaft 8 or some other suitable method of causing the particles 20 to penetrate the cooperating surface.

While several embodiments of my invention have been shown and described, it will be apparent that other adaptations and modifications may be made without departing from the scope of the appended claims.

I claim:

1. A method of mechanically locking a surface of a roll to a cooperating surface of a drive member which comprises interposing particulate grit of a hardness greater than at least one of the roll and drive members between said roll surface and the cooperating surface of the drive member, juxtaposing said surfaces with grit therebetween, forcing said roll and drive member together to cause said grit to penetrate at least one of said surfaces and bonding said grit to the other of said surfaces thereby mechanically locking the roll to said drive member.

2. A method according to claim 1 wherein the locked surfaces are the lateral surface of the roll and a cooperating surface of the drive member and said drive member is affixed to a rotatable shaft.

3. A method according to claim 2 wherein the mesh of the particulate grit is in the range of +20 to −30 mesh.

4. A method according to claim 2 wherein bonding said grit to said other surface is by a mechanical bond.

5. A method according to claim 4 wherein the mechanical bond of grit to said other surface is created by an adhesive substance.

6. A method according to claim 4 wherein bonding said grit to said other surface is created by forcing the grit to penetrate that surface.

7. A method according to claim 3 wherein bonding said grit to said other surface is created by a chemical bond.

8. A method according to claim 2 wherein the bond of grit to said other surface is created by applying a brazing metal and grit to said other surface and heating said brazing metal to brazing temperature.

9. A method according to claim 8 wherein the brazing metal is from the group consisting of copper and copper alloy and said brazing metal is applied to said surface in a slurry of alloy powder suspended in a solution of acetone containing 2% Lucite and the grit is on said surface prior to heating to brazing temperature.

10. A method according to claim 8 wherein the filler material is applied to said surface in a sandwich of sheets of alloy foil having pressed therebetween the grit and affixed to said surface prior to heating to brazing temperature.

References Cited

UNITED STATES PATENTS 3,014,266  12/1961  Samuels et al. _____ 29—148.4R
3,226,800  1/1966   Fenlason _____ 29—148.4R THOMAS H. EAGER, Primary Examiner U.S. Cl. X.R.

29—459